United States Patent [19]

Kennedy, III et al.

[11] Patent Number: 4,537,685

[45] Date of Patent: Aug. 27, 1985

[54] METHOD FOR SEPARATING INTERMIXED SOLIDS AND LIQUIDS

[75] Inventors: Alvin B. Kennedy, III, Alvin; Joseph S. Fontaine, West Columbia; Alfred J. Kennard, Houston; J. Bruce Morrison, Friendswood, all of Tex.

[73] Assignee: Methods Engineering, Inc., Angleton, Tex.

[21] Appl. No.: 463,006

[22] Filed: Feb. 1, 1983

[51] Int. Cl.³ ............................................. C02F 1/56
[52] U.S. Cl. ..................................... 210/709; 210/712
[58] Field of Search .............................. 210/732–734, 210/709, 712, 714, 715, 721, 738, 785, 713

[56] References Cited

U.S. PATENT DOCUMENTS

| | | | |
|---|---|---|---|
| 3,790,476 | 2/1974 | Spoerle et al. | 210/734 |
| 3,956,116 | 5/1976 | Brandt | 210/42 R |
| 4,093,542 | 6/1978 | Dahmen et al. | 210/734 |
| 4,303,532 | 12/1981 | Smelley et al. | 210/732 |
| 4,330,450 | 5/1982 | Lipowski et al. | 210/734 X |

OTHER PUBLICATIONS

Scheiner et al., "Large-Scale Dewatering of Phosphatic Clay Waste from Central Florida," Bureau of Mines Report of Investigation RI-8611, 1982.

Primary Examiner—Thomas Wyse
Attorney, Agent, or Firm—Guy E. Matthews

[57] ABSTRACT

A mixture containing solid and liquid components is saturated with a polyelectrolyte compound, over-flocculating the solids contained therein and causing the solids to coalesce into masses or globules. These coalesced masses may then be separated from the liquid component, yielding substantially separated phases.

3 Claims, 1 Drawing Figure

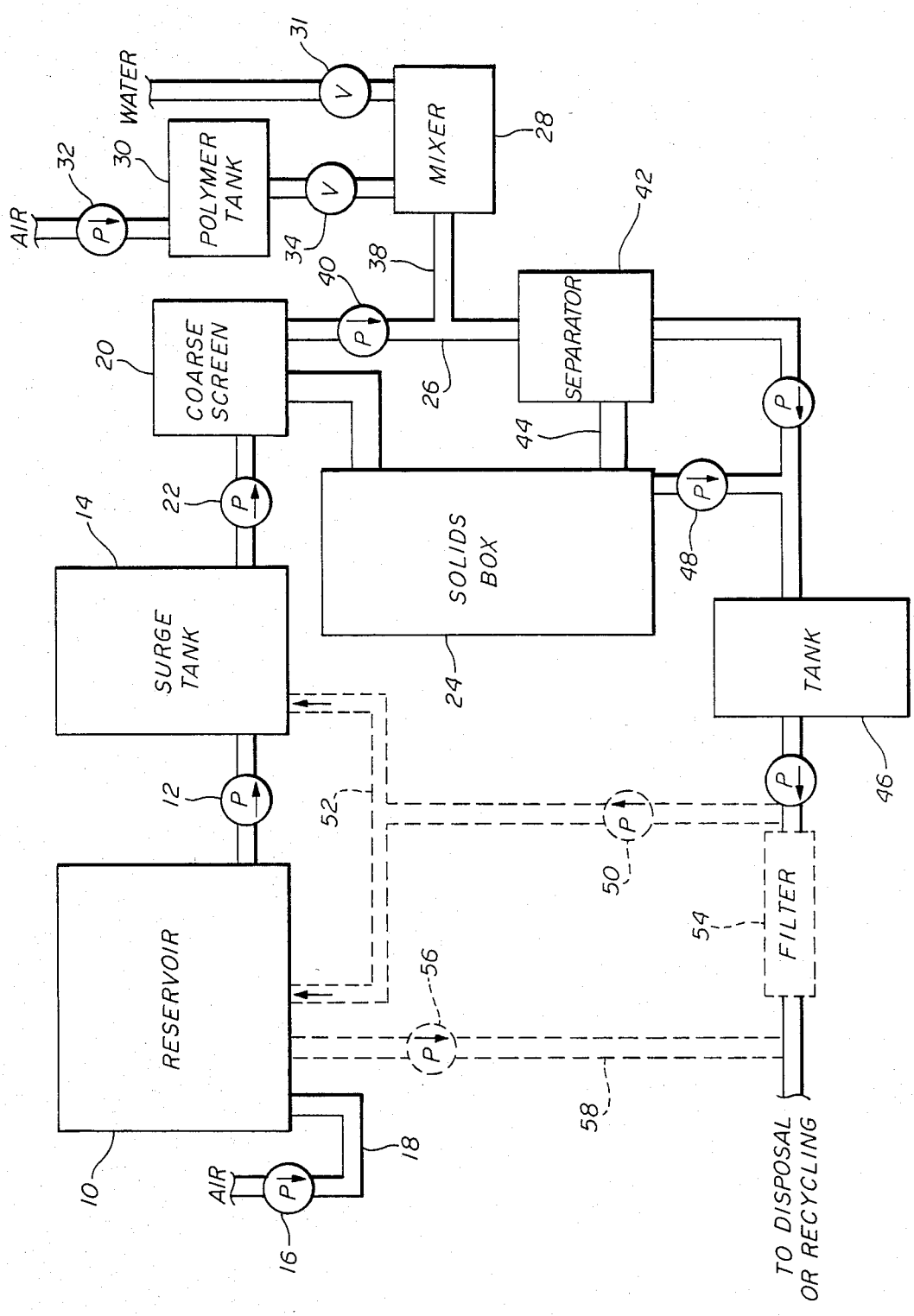

METHOD FOR SEPARATING INTERMIXED SOLIDS AND LIQUIDS

BACKGROUND OF THE INVENTION

This invention relates generally to methods and apparatus for separating intermixed solids and liquids, and more specifically relates to methods and apparatus for separating industrial wastes into solid and liquid phases to facilitate the disposal or recycling of each phase.

Three principal methods of disposing of waste matter are disposal within injection wells, disposal within land fills and incineration. In injection well disposal, liquid waste is pumped into relatively porous rock formations which are bounded by relatively non-porous formations such that the liquid within the porous formation is retained within that formation and is restrained from migration into other formations and/or fluid reservoirs. It will be readily appreciated that because the liquid waste is pumped into a rock formation, such as porous limestone, the liquid must be truly liquid, containing little or no particulate matter which would act to occlude the pores within the formation. This then may, in some cases, require that the liquid contain less than roughly one hundred parts per million ("ppm") of solid or particulate matter and may further require that such particulate matter be of less than roughly two-to-five microns in size, dependent upon the porosity of the formation in which the liquid is to be injected.

In land fill disposal, a pit is formed and a liner of either earthen matter, such as clay, or a synthetic material, such as plastic, is placed within the pit to retain all of the matter disposed therein. Environmental concerns and legislation reflecting those concerns requires that only solid matter be disposed of within land fills so as to avoid any leakage of contaminated waste should a break or tear occur within the liner. A conventional technique of preparing waste containing liquid components for disposal is to mix a liquid adsorbing compound such as flyash or portland cement with the waste to adsorb the liquid and render the waste into a safely disposable solid. Obviously, the greater the liquid component within the waste, the more liquid-adsorbing compound which will be required to solidify the waste. This presents two significant problems; first, the cost of the compound, and second, the greater mass of solid waste to be disposed of. Because of the cost and limited volume of the land fill site, any increase in waste volume has a significant impact upon disposal costs. It is not unrealistic to increase the volume of waste to be disposed of by a factor of three by the time a sufficient amount of adsorbent compound has been added to adsorb a significant liquid phase within the waste matter.

In some cases, such as where organic solids are retained within the liquid, separation of the liquid from the solids may facilitate the disposal of the waste solids by incineration. It will be readily appreciated that the liquid content of the solids, as well as the composition of the solids, will be a major factor in the feasibility of disposal of the waste matter by incineration.

Accordingly, the present invention provides method and apparatus whereby solid and liquid waste products may be substantially separated from one another with a minimal increase in volume of disposable waste.

SUMMARY OF THE INVENTION

The present invention provides a method and apparatus for separating a mixture containing both solid and liquid phases. This invention is of particular usefulness in separating solid and liquid phase components of industrial wastes to facilitate the recycling or disposal of such components. In a preferred embodiment, a polyelectrolyte compound is introduced into the waste matter in such proportions as to over-flocculate the solids therein. The solids are over-flocculated such that they coalesce into globules or masses which may then be separated from the remaining liquid phase. This separation may be achieved by use of an appropriately sized vibrating screen mesh. In such a preferred embodiment, the liquid from which the solids have been removed is returned to the untreated waste, thereby serving to remove excess polyelectrolyte from the liquid and promoting the coalescing of the solids in the waste prior to further treatment thereof.

BRIEF DESCRIPTION OF THE DRAWING

FIG. 1 is a schematic illustration of an apparatus for separating intermixed solids and liquids in accordance with the present invention.

DETAILED DESCRIPTION OF A PREFERRED EMBODIMENT

Referring now to the drawings in more detail, particularly to FIG. 1, therein is schematically illustrated a system for separating solids from liquids in accordance with the present invention. As will be apparent from the discussion to follow, not all components illustrated in FIG. 1 are required for the practice of the present invention but are shown as forming an optimal system for many applications of the present invention. Reservoir 10 represents the pond or tank in which the waste products have been retained awaiting treatment and disposal. As stated earlier herein, these waste products typically have both solid and liquid components. It will be appreciated that these solids may be of such small size as to be individually invisible to the naked eye and of such small mass as to be consistently held in suspension within the liquid. At the other extreme, the solids may be present in such concentrations as to cause the waste matter to assume a mushy or semi-fluid character, commonly known as a "sludge," for example, in waste matter containing 30–50% solids by dry weight. An important and novel feature of the present invention is the over-flocculating of the waste matter with a polyelectrolyte, preferably a long-chain, high molecular weight polymer compound and most preferably a high molecular weight polymer emulsion. The polymer may be of one of three types reflecting a state of electrical charge; cationic, anionic, or non-ionic. The polymer must be chosen in response to the charge of the solids within the sludge. It has been found that optimal efficiency in determining the correct polymer in a specific application may be obtained by simple empirical experimentation upon samples taken from the reservoir. A sample of polymer is mixed with a sample of the waste matter, the polymer typically being added to the waste matter in the proportion of approximately 200 to 1,000 ppm, though this range may vary significantly at each extreme, potentially extending proximate 5,000 ppm. In this experimentation, it will be apparent that one charge-type of polymer is effective or most effective in drawing the waste solids together. The desired effect is that the solids be drawn together into gelatinous masses or globules. Once the correct charge polymer is determined, if the first polymer of that charge does not yield gelatinous masses of optimal size or stability then other polymers of that charge may be experimented with. An appropriate gauge for this initial test for the size and stability of the coalesced, over-flocculated solids is whether a substantial portion of the solids will be retained by screen of thirty five mesh or larger (all screen sizes referred to herein are Tyler Standard Screen Scale). Although some solids, such as some sands, have been found not to react with the polymers to form the desired masses, the vast majority of waste solids found in industrial waste should be treatable with this method. Two polymers which have been found to be particularly suitable for usage with the present invention in many applications are long-chain polyacrylamides such as those sold under brand names Tretolite TFL 362 (cationic) and Tretolite TFL 381 (non-ionic) manufactured by the Petrolite Corporation, Tretolite Division, 369 Marshall Avenue, Saint Louis, Missouri. These polymers are emulsions which, as stated previously herein, is the preferred form for usage with the present invention, the high molecular weight of these emulsions enhancing the formation of relatively large gelatinous masses and also being optimally cost effective.

Once the polymer is chosen and the approximate dose rate determined, the treatment of the waste in bulk may begin. In an intended operation in accordance with the present invention, waste matter is pumped from reservoir 10 by pump 12 into surge tank 14. Because reservoir 10 may be very large, having a capacity well in excess of a million gallons, and because of the difficulties often encountered in pumping from such a large reservoir, including possibly operating such pumping operation from a floating platform, surge tank 14 is utilized to provide a constant supply of waste matter to the remainder of the processing apparatus. This constant supply of waste matter prevents the potential need to shut down the processing system if temporary difficulties are encountered in pumping from reservoir 10.

A pressurized air supply, depicted as pump 16 and conduit 18, is preferably provided to fluidize or to circulate the waste matter by air sparging, thereby promoting fluidity of the waste and the suspension of the waste solids within the liquid at least in the vicinity of the pumping intake. This air sparging facilitates the pumping operation and promotes a roughly consistent, or at least slowly fluctuating, proportional mixture of the two components so as to minimize the necessity for adjustment of the polymer dose rate as will be discussed later herein. An air pressure in the vicinity of 50 pounds per square inch ("psi") has been found satisfactory to cause the desired fluidization or circulation in many industrial wastes. In some applications, it may be desirable to maintain some form of fluidizing or circulating element, such as the above-described air sparging, in the surge tank as well, for reasons similar to those stated above.

Where the waste matter contains very large pieces of solids which may be easily separated from the liquid, it may be desirable to strain such pieces from the waste matter prior to further treatment. A preferred method for this would be by straining the matter through a conventional screen element having a relatively coarse mesh. The selection of the screen mesh size would be a matter of choice readily apparent to one skilled in the art. Such coarse screen should freely pass the liquid and suspended solids, separating only the larger solids. A pump 22 may be used to pump the waste matter from surge tank 14 to coarse screen 20. Separated solids will be directed to solids box 24 while the remaining waste matter will be directed or pumped to mixing conduit 26. It is in mixing conduit 26 that the waste will be treated with the polymer previously determined in the manner described herein.

Prior to mixing the polymer and the waste matter, it is highly preferable to dilute the polymer with a suitable carrier, typically water. Therefore, a mixer 28 is provided to facilitate this mixing. Mixer 28 may be of several forms known to the art, such as those known as static mixers. Advantageous results have been achieved with a mixer formed of a length of pipe, preferably roughly one to one and one-half inches in internal diameter, having a flow-disturbing medium disposed longitudinally therein. A length of ordinary link chain secured within the length of pipe at the upstream end thereof has been found to be highly satisfactory as the flow-disturbing medium in mixer 28.

The polymer will be introduced into the waste matter at a varying rate, such rate ranging from extremes as low as a few drops per minute to as high in the described embodiment as one-half gallon per minute. In the particular embodiment illustrated, an atmospherically sealed polymer holding tank 30 containing a quantity of the polymer is pressurized by compressed air. Compressed air may be supplied by a second compressor pump 32 as depicted in FIG. 1, or, alternatively, may be supplied by the first compressor pump 16 providing air for inducing circulation in reservoir 10. It is to be understood that appropriate valves and pressure regulation may be placed on the compressed air supply or supplies as needed or desired in accordance with techniques familiar to the art. A valve 34 may then be utilized to control the flow rate of the polymer into mixer 28. Similarly, a valve 36 may be placed in the water supply line to regulate the flow rate of water into mixer 28. It will be noted that the flow rate of water is not so critical as is the polymer flow rate and may remain generally constant while the polymer flow rate is varied significantly to achieve the desired over-flocculation of the waste solids, to be further described later herein.

A conduit 38 is then used to transport the polymer mixture to mixing conduit 26. Mixing conduit 26 is of adequate size to adequately carry a volume of the waste matter while allowing circulation thereof. A mixing conduit 26 of approximately three inches internal diameter has been found to be satisfactory in many applications. Pump 40 is used to move the waste matter from the tank of coarse screen 20, through mixing conduit 26, to separator 42. The flow rate of the waste matter through mixing conduit 26 may vary drastically but may be on the order of 70 to 150 gallons per minute. As the waste matter passes through mixing conduit 26, the polymer mixture is induced into the mixing conduit 26. The waste matter is over-saturated with the polymer mixture so as to over-flocculate the solids therein, causing the solids to coalesce to form gelatinous masses as discussed earlier herein. Although a rough dose rate of polymer to waste matter may be determined through the pre-treatment testing, the over-flocculation should be visually observed to adjust the polymer dose rate as necessary. The polymer dose rate should be high enough that the gelatinous masses formed are of such size and stability as to be retained by separator 42 while the liquids freely pass therethrough. It will be appreciated that in applications involving significant solids content within the waste, the coalesced solids may assume the general appearance of a sludge. At the other extreme, generally, if the liquid assumes a milky or cloudy appearance, the dose rate of polymer is too high and should be reduced.

A significant factor in the separation operation is at what point the polymer is introduced into the waste material. The polymer mixture must have an opportunity to mix with the waste matter and the solids must have an opportunity to coalesce before the waste matter reaches separator 42. This again is best determined empirically, the optimal point of introduction varying with such factors as the material components and their relative proportions within the waste matter, the flow rate of the waste through mixing conduit 26, the particular polymer being used, and the degree to which such polymer is dilluted.

The over-flocculation described is far in excess of the flocculation which would be induced if the solids were to be treated by conventional techniques such as conventional clarifier usage. Conventional polymer use, such as to clarify liquids, typically recommends a dose rate on the order of 10 ppm to 50 ppm. Over-flocculation in accordance with the present invention may involve a ratio of polymer to untreated waste a hundred times higher than that encountered with such conventional techniques. Further, solids flocculated in such conventional manner form very small bodies, typically on the order of 0.031 to 0.062 inches in diameter. Solids over-flocculated in accordance with the present invention are preferably treated to form masses from 0.5 inches in diameter on up.

Once the solids have been coalesced into the described gelatinous masses, they are easily separated from the liquid waste by separator 42. Separator 42 is preferably a conventional screen and most preferably is a vibrating screen having a suitably sized mesh to retain the masses while passing the liquid. A screen of 20 meshor larger is typically satisfactory for this purpose. A vibrating screen offering sixteen feet of straining surface has been found satisfactory in a system having dimemsions as given in this exemplary description of one preferred embodiment, although it is obvious to one skilled in the art that screens of many different sizes may be used and that the screen dimensions may be adapted to suit the particular application. It is foreseen that other forms of solid/liquid separators which are known to the art could be used in accordance with the present invention or could be adapted for such use, however, the described vibrating screen has been found highly effective and advantageous. It is emphasized that the relatively small bodies produced by conventional flocculating techniques as described earlier herein are typically unstable and will separate or deform to pass through a vibrating screen mesh, even with a screen of 35 mesh, such mesh having orifices proximate 400 microns. Conversely, the masses formed through practice of the present invention are not only larger but much more stable and facilitate the use of a vibrating screen having a screen of 10 to 20 mesh, such screens having orifices of from approximately 600 to 800 microns. In some applications, even larger screens may be used. These larger screens facilitated by the over-flocculating of the solids as described herein serve to maintain a free flowing path for the liquid through the screen and therefore promote optimal treatment rates in excess of those obtainable with comparable, conventional systems.

The solids separated by separator 42 are passed over chute 44 to solids box 24 while the fluid is preferably pumped to a holding tank 46. A small amount of the fluid typically will not pass through the screen but will travel over the screen and pass with the solids into solids box 24. Any such liquid may be easily decanted from solids box 24 and transferred to tank 46 by a pump 48. The solids within solids box 24 may be transferred for disposal, requiring, after the described treatment, relatively minimal, if any, addition of adsorbent compound to render them satisfactory for land fill disposal.

The treated fluid within tank 46 will often contain some excess polymer. It is therefore advantageous to transfer this treated liquid by means of a pump 50 and conduit 52 back into either reservoir 10 or surge tank 14. This removes the excess polymer from the liquid and allows the polymer to concentrate the solids within the untreated waste prior to any further treatment of the waste as described herein. When the liquid is recycled in this manner, and the excess polymer removed therefrom, then clean liquid may often be decanted from the surface of reservoir 10, as by pump 56 and conduit 58. This clean liquid may then be transferred for disposal or recycling. It is preferable in such a recycling and decanting operation to return the liquid to the reservoir at a location intermediate the pumping and decanting locations, which are preferably located proximate opposite extremes of reservoir 10. This prior treatment of the waste allows a reduction in the amount of polymer which must be introduced into the waste matter in mixing conduit 26. This recirculation of the treated liquid therefore serves not only to further remove excess polymer from the liquid but yields optimum economic efficiency by reducing the volume of fresh polymer required for the operation.

Either before or after such recycling of the treated liquid, the liquid may be transferred to disposal or plant recycling.

It has been found that with proper operation of a system as described herein, where the liquid phase is to be recycled or put to another use, that the volume of waste to be disposed of may be reduced by approximately 50 to 75%, such reduction yielding disposable solids which are approximately 20 to 30% solids by dry weight. Simultaneously, the separated liquid phase, which may be recycled or disposed of as appropriate, may be separated to such extent that it contains less than approximately 10 to 100 ppm solids. These contents are of the liquid as in tank 46 and the solids as in solids box 24, i.e., prior to any filtration. Further, a system having dimensions as described herein has been found capable of treating roughly 700–1,200 barrels of waste matter per day. Further, a specific advantage of the present invention is that an apparatus as described herein and depicted in FIG. 1 and capable of the above-stated treatment rates may be easily contained upon one or more trucks or trailers and thus may be transported from site to site in a manner not readily obtainable with conventional systems of such processing capabilities.

Many modifications and variations besides those specifically mentioned may be made in the techniques described herein as depicted in the accompanying drawings without departing substantially from the concept of the present invention. For example, apparatus of significantly different size and/or capacities may be employed in accordance with the present invention. Further, the individual components as described herein may be arranged or modified so as to alleviate the need for some pumps or other apparatus disclosed herein. Accordingly, the descriptions given herein are exemplary only and are not intended as limitations on the scope of the present invention.

The embodiments of the invention in which an exclusive property or privilege is claimed are defined as follows: We claim:

1. A continuous method useful in the separation of intermixed solids and liquid phase components of wastes so as to facilitate the recycling or disposal thereof, comprising the steps of:
   (a) pretesting a sample of the waste designated for treatment so as to determine the character of solid waste matter and content of suspended and/or settled waste solids,
   (b) selecting a polyelectrolyte compound calculated to react most effectively with the tested waste, said polyelectrolyte compound being a high molecular weight polymer emulsion selected from the group consisting of cationic, and anionic and non-ionic polymers,
   (c) calculating a dosage rate determined to overflocculate the waste matter and to achieve optimal efficiency from the polyelectrolyte-waste matter reaction so as to achieve solid waste particles which will freely dewater, which are larger than 20 mesh, and which exhibit an appropriate durability factor to allow separation of the solid waste particles from the liquid phase,
   (d) air sparging the waste source to promote consistency and fluidity so as to minimize adjustment of the dosage rate of polyelectrolyte compounds to waste matter,
   (e) continuously diluting the polyelectrolyte compound with water,
   (f) introducing the diluted polyelectrolyte compound into the waste matter without mechanical agitation at a varying rate so as to achieve over-flocculation of the suspended and/or settled waste solids,
   (g) separating the over-flocculated solid waste particles from the treated liquid waste with a vibratory shaker screen,
   (h) recycling all of the treated liquid for further use as a pre-treatment for untreated waste thereby reducing the overall polyelectrolyte requirement for continued treatment, and elminating the need to remove the polyelectrolyte from the liquid.

2. The method of claim 1, wherein the dosage rate of polyelectrolyte compound to waste matter is generally within the range of two hundred to one thousand parts of polymer to one million parts of waste matter.

3. The method of claim 2, wherein the diluted polyelectrolyte compound is introduced into the waste matter at a varying rate, ranging from a few drops per minute to one-half gallon per minute.

* * * * *